(12) United States Patent
Falkenstern et al.

(10) Patent No.: US 10,987,960 B2
(45) Date of Patent: *Apr. 27, 2021

(54) COUNTERFEIT DETECTION USING MACHINE READABLE INDICIA

(71) Applicant: Digimarc Corporation, Beaverton, OR (US)

(72) Inventors: Kristyn R. Falkenstern, Portland, OR (US); Alastair M. Reed, Lake Oswego, OR (US); Tomas Filler, Beaverton, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/513,355

(22) Filed: Jul. 16, 2019

(65) Prior Publication Data

US 2020/0156395 A1 May 21, 2020

Related U.S. Application Data

(63) Continuation of application No. 16/121,351, filed on Sep. 4, 2018, now Pat. No. 10,350,926, which is a
(Continued)

(51) Int. Cl.
*H04N 7/167* (2011.01)
*G06K 9/00* (2006.01)
(Continued)

(52) U.S. Cl.
CPC ............. *B41M 3/14* (2013.01); *C09D 11/037* (2013.01); *C09D 11/50* (2013.01); *G06T 1/0028* (2013.01);
(Continued)

(58) Field of Classification Search
USPC ....... 382/100, 103, 106–107, 162, 166, 168, 382/173, 181, 219, 224, 254, 274, 276,
(Continued)

(56) References Cited

U.S. PATENT DOCUMENTS

| | | | | |
|---|---|---|---|---|
| 4,869,946 A | * | 9/1989 | Clay | ...................... G06K 19/14 428/167 |
| 5,457,515 A | | 10/1995 | Quadracci | |

(Continued)

FOREIGN PATENT DOCUMENTS

| | | |
|---|---|---|
| EP | 0638614 A1 | 2/1995 |
| WO | 201109934 A1 | 7/2013 |

(Continued)

OTHER PUBLICATIONS

Sarita Poonia; "A Secure Image Based Steganography and Cryptography with Watermarking"; Jun. 8, 2013.*

(Continued)

*Primary Examiner* — Seyed H Azarian
(74) *Attorney, Agent, or Firm* — Digimarc Corporation

(57) ABSTRACT

This disclosure relates to counterfeit detection and deterrence using advanced signal processing technology including steganographic embedding and digital watermarking. Digital watermark can be used on consumer products, labels, logos, hang tags, stickers and other objects to provide counterfeit detection mechanisms.

19 Claims, 6 Drawing Sheets
(6 of 6 Drawing Sheet(s) Filed in Color)

Related U.S. Application Data continuation of application No. 15/255,083, filed on Sep. 1, 2016, now Pat. No. 10,065,441.

(60) Provisional application No. 62/212,948, filed on Sep. 1, 2015.

(51) Int. Cl.
*B41M 3/14* (2006.01)
*C09D 11/50* (2014.01)
*C09D 11/037* (2014.01)
*G06T 1/00* (2006.01)

(52) U.S. Cl.
CPC ...... *B41M 3/148* (2013.01); *G06T 2201/0083* (2013.01); *G06T 2201/0202* (2013.01)

(58) Field of Classification Search
USPC ...... 382/286–298, 305; 428/64.1; 206/459.1; 380/201
See application file for complete search history.

(56) References Cited

U.S. PATENT DOCUMENTS

| | | | |
|---|---|---|---|
| 5,967,032 A | 10/1999 | Bravenec | |
| 5,998,609 A * | 12/1999 | Aoki | C09B 47/0675 428/64.1 |
| 6,590,996 B1 | 7/2003 | Reed | |
| 6,721,440 B2 | 4/2004 | Reed | |
| 6,817,530 B2 | 11/2004 | LaBrec | |
| 6,827,277 B2 | 12/2004 | Bloomberg | |
| 6,856,462 B1 | 2/2005 | Scarbrough | |
| 6,900,944 B2 | 5/2005 | Tomczyk | |
| 6,923,378 B2 | 8/2005 | Jones | |
| 7,054,461 B2 | 5/2006 | Zeller | |
| 7,153,047 B2 | 12/2006 | Goggins | |
| 7,213,757 B2 | 5/2007 | Jones | |
| 7,286,685 B2 | 10/2007 | Brunk | |
| 7,305,104 B2 | 12/2007 | Carr | |
| 7,369,678 B2 | 5/2008 | Rhoads | |
| 7,389,939 B2 | 6/2008 | Jones | |
| 7,427,030 B2 | 9/2008 | Jones | |
| 7,512,249 B2 | 3/2009 | Alasia | |
| 7,554,699 B2 | 6/2009 | Wang | |
| 7,559,983 B2 | 7/2009 | Starling | |
| 7,712,673 B2 | 5/2010 | Jones | |
| 7,744,001 B2 | 6/2010 | LaBrec | |
| 7,762,468 B2 | 7/2010 | Jones | |
| 7,892,338 B2 | 2/2011 | Degott | |
| 8,062,735 B2 | 11/2011 | Bi | |
| 8,123,134 B2 | 2/2012 | Reed | |
| 8,416,499 B2 | 4/2013 | Liu | |
| 8,605,359 B2 | 12/2013 | Spiro | |
| 8,668,137 B2 | 3/2014 | Herzig | |
| 8,693,101 B2 | 4/2014 | Tomczyk | |
| 8,840,029 B2 | 9/2014 | Lawandy | |
| 8,854,684 B2 | 10/2014 | Zomet | |
| 8,953,084 B2 | 2/2015 | Kamath | |
| 8,985,634 B2 | 3/2015 | Kiuchi | |
| 9,021,947 B2 | 5/2015 | Landa | |
| 9,071,714 B2 | 6/2015 | Zomet | |
| 9,087,376 B2 | 7/2015 | Rodriguez | |
| 9,105,550 B2 * | 8/2015 | Rhoads | H01L 27/14621 |
| 9,147,222 B2 | 9/2015 | Reed | |
| 9,380,186 B2 * | 6/2016 | Reed | G06K 19/06028 |
| 9,401,001 B2 | 7/2016 | Reed | |
| 9,418,282 B2 | 8/2016 | Rutz | |
| 9,565,335 B2 | 2/2017 | Reed | |
| 9,583,529 B2 | 2/2017 | Rhoads | |
| 9,621,760 B2 | 4/2017 | Rhoads | |
| 9,635,378 B2 | 4/2017 | Holub | |
| 9,747,656 B2 | 8/2017 | Stach | |
| 9,749,607 B2 | 8/2017 | Boles | |
| 9,754,341 B2 | 9/2017 | Falkenstern | |
| 10,065,441 B2 | 9/2018 | Falkenstern | |
| 10,217,182 B1 | 2/2019 | Holub | |
| 10,350,926 B2 | 7/2019 | Falkenstern | |
| 2006/0197337 A1 | 9/2006 | Merry | |
| 2010/0150396 A1 | 6/2010 | Reed | |
| 2010/0150434 A1 | 6/2010 | Reed | |
| 2011/0007935 A1 | 1/2011 | Reed | |
| 2012/0065313 A1 | 3/2012 | Demartin | |
| 2012/0163714 A1 * | 6/2012 | Cvetkovic | G09C 5/00 382/166 |
| 2013/0329006 A1 | 12/2013 | Boles | |
| 2014/0052555 A1 | 2/2014 | MacIntosh | |
| 2014/0244514 A1 | 8/2014 | Rodriguez | |
| 2015/0156369 A1 | 6/2015 | Reed | |
| 2015/0187039 A1 | 7/2015 | Reed | |
| 2015/0227925 A1 | 8/2015 | Filler | |
| 2016/0093011 A1 | 3/2016 | Reed | |
| 2016/0105585 A1 | 4/2016 | Holub | |
| 2016/0217547 A1 | 7/2016 | Stach | |
| 2016/0275326 A1 | 9/2016 | Falkenstern | |
| 2016/0275639 A1 | 9/2016 | Holub | |
| 2017/0024840 A1 | 1/2017 | Holub | |
| 2018/0039805 A1 | 2/2018 | Boles | |
| 2018/0047127 A1 | 2/2018 | Falkenstern | |

FOREIGN PATENT DOCUMENTS

| | | |
|---|---|---|
| WO | 2015077455 A1 | 5/2015 |
| WO | 2016025631 | 2/2016 |

OTHER PUBLICATIONS

Karl D. D. Willis et al: "InfraStructs", ACM Transactions on Graphics, vol. 32, No. 4, Jul. 1, 2013 (Jul. 1, 2013), p. 1, XP055148929, ISSN: 0730-0301, DOI: 10.1145/2461912.2461936.

* cited by examiner

COUNTERFEIT DETECTION USING MACHINE READABLE INDICIA

RELATED APPLICATION DATA

This application is a continuation of U.S. patent application Ser. No. 16/121,351, filed Sep. 4, 2018 (issued as U.S. Pat. No. 10,350,926), which is a continuation of U.S. patent application Ser. No. 15/255,083, filed Sep. 1, 2016 (issued as U.S. Pat. No. 10,065,441), which claims benefit of U.S. Provisional Application No. 62/212,948 filed Sep. 1, 2015. This application is related to assignee's U.S. patent application Ser. No. 14/616,686, filed Feb. 7, 2015 (issued as U.S. Pat. No. 9,380,186 B2), Ser. No. 14/725,399, filed May 29, 2015 (issued as U.S. Pat. No. 9,635,378), Ser. No. 15/072,884, filed Mar. 17, 2016 (published as US 2017-0024840 A1), Ser. No. 14/588,636, filed Jan. 2, 2015 (published as US 2015-0187039 A1, issued as U.S. Pat. No. 9,401,001), and Ser. No. 15/137,401, filed Apr. 25, 2016 (issued as U.S. Pat. No. 9,565,335). Each of the patent documents mentioned in this paragraph is hereby incorporated herein by reference in its entirety, including all drawings and any appendices

TECHNICAL FIELD

This disclosure relates to counterfeit detection and deterrence using advanced signal processing technology including steganographic embedding and digital watermarking.

BACKGROUND AND SUMMARY

Counterfeiting is Big Business.

The numbers are staggering:

$1.7 billion—Value of seized counterfeit goods at U.S. borders in fiscal 2013. See, e.g., http://www.iacc.org/resources/about/what-is-counterfeiting.

$1.77 Trillion—Projected Value of Global Trade in Counterfeit and Pirated Goods in 2015. See, e.g., http://www.iacc.org/resources/about/statistics.

Counterfeit goods span multiple industries including everything from consumer goods, apparel, accessories, music, pharmaceuticals, cigarettes, to automobile and manufactured parts, toys and electronics.

One promising technology for automated counterfeit detection is steganographic encoding (or embedding). One form of steganographic encoding includes digital watermarking. Digital watermarking is a process for modifying physical or electronic media to embed a machine-readable code (or "auxiliary data") into the media. The media may be modified such that the embedded code is obscured, yet may be detected through an automated detection process. Most commonly, digital watermarking is applied to electronic or physical objects such as images, audio signals, and video signals. However, it may also be applied to other types of objects, including, e.g., product packaging, electronics such as circuit boards and CPUs, stickers, logos, product hang tags, line-art, software, multi-dimensional graphics models, and surface textures of such objects.

Auxiliary data embedding systems typically have two components: an encoder (or embedder) that embeds the auxiliary signal in a host image or object, and a decoder (or detector) that detects and reads the embedded auxiliary signal from the host image or object. The encoder embeds the auxiliary signal by altering an image or object or generating a signal carrying the auxiliary data. The detection component analyzes a suspect image, object or signal to detect whether an auxiliary signal is present, and if so, extracts or reads information carried in it.

Several particular digital watermarking and related auxiliary data embedding techniques have been developed. The reader is presumed to be familiar with the literature in this field. Particular techniques for embedding and detecting imperceptible digital watermarks are detailed in the assignee's patent documents including U.S. Pat. No. 6,590,996; US Published Patent Application Nos. 20140052555 and 20150156369; U.S. patent application Ser. No. 14/725,399, filed May 29, 2015 (issued as U.S. Pat. No. 9,635,378), Ser. No. 14/724,729, filed May 28, 2015 (published as 20160217547; issued as U.S. Pat. No. 9,747,656), Ser. No. 15/073,483, filed Mar. 17, 2016 (issued as U.S. Pat. No. 9,754,341); and International Application No. PCT/US2015/44904, filed Aug. 12, 2015 (published as WO 2016/025631). Each of the patent documents mentioned in this paragraph are hereby incorporated herein by reference in its entirety, including all drawings and any appendices.

This disclosure describes objects, methods, apparatus and systems using embedded auxiliary signals to deter and detect counterfeited goods. Detection can be facilitated with a handheld reading device including a camera equipped smartphone (e.g., iPhone 6 or Samsung Galaxy 6) having an illumination source such as a flash or torch.

One aspect of the disclosure teaches digital watermarking solutions for use with so-called lenticular structures, e.g., lenticular lenses. Multiple, inter-related but different watermark payloads can be printed on the lenticular structure and viewed at differing angles. Such lenticular structures can include or cooperate with an adhesive for application as a sticker or label, or for direct application on a consumer packaged good. The multiple, different watermark payloads can be detected along with watermark signal strength at different viewing angles. A counterfeit without a lenticular structure will not having a varying signal strength associated with different angles, and thus can be recognized as fraudulent.

Another aspect of the disclosure teaches digital watermarking solutions using metallic inks. The metallic ink carries a digital watermark signal which can be obscured, in part, by a cooperating metameric (but non-metallic) spot color. The metallic and cooperating spot color will appear flat or the same (e.g., not show watermark modulations) unless illuminated by torch or detected by movement. Scanning and re-printing a metallic-ink-watermarked object will not include the same metallic ink in a reproduction, allowing for rapid and automated detection of the counterfeit.

Still another aspect of the disclosure teaches a narrow band absorption dye for conveying a digital watermark signal. The narrow band can be selected to cooperate with a mobile device's illumination source. A watermark detector can read the digital watermark signal with and without torch illumination, and the difference in watermark strength can be used to determine if an object is an original or counterfeit.

Yet another aspect teaches metameric ink pairs selected from, e.g., PANTONE inks, that change their color properties as seen by a camera and cooperating watermark detector under differing illumination. A digital watermark signal may be detected under one lighting condition and then reverse its signal polarity under a differing lighting condition. The differing signal polarities can be used to recognize an object as genuine.

Further aspects, features and advantages will become even more apparent with reference to the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following sections describe various techniques for automatically distinguishing a copy from an original, among other features. The section headings are not meant to limit the scope of the disclosure, as subject matter under one such heading can readily be combined with subject matter under another such heading.

I. High Capacity Lenticular Watermarking

Our first anti-counterfeiting solution combines digital watermarking and so-called "lenticular printing."

Figure 1A:
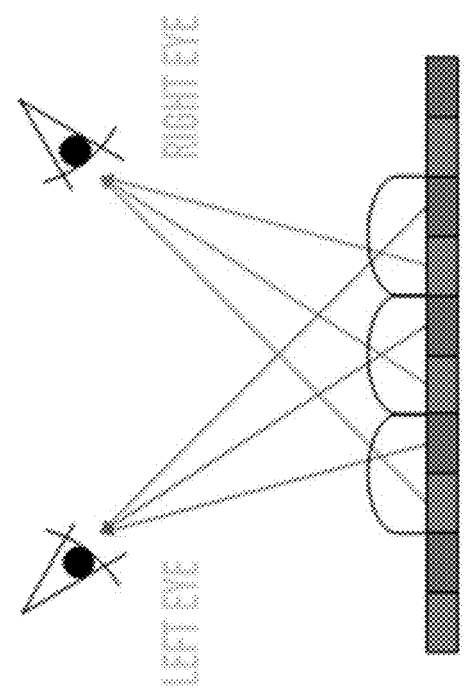
FIG. 1A illustrates lenticular printing with a lens structure and an interlaced image.

Lenticular printing may include a process of creating a composite interlaced image by interlacing multiple images, and attaching or co-locating the interlaced image with a lenticular lens structure, such as a sheet or a set of extruded lines, to form a lenticular image article. See, e.g., FIG. 1A.

When digitally processing the composite interlaced image, various images can be collected and flattened into individual, different frame files, and then digitally combined by interlacing into a single final file. Interlacing can also involve dividing visual images into strips, alternating the image strips and arranging the image strips under a field of lenticular structures. The created image stripes from the multiple images are combined and interlaced into a single image so that, for example, a first stripe of a first image is disposed first, followed by a first stripe of a second image, followed by a second stripe of the first image, and so on. The interlaced images can be printed directly to a back side of the lens sheet, e.g., by a single-step process or they can be printed to a substrate and then laminated to the lens sheet, e.g., by a two-step process, such that individual lenses of the array are disposed and registered over interlaced stripes. If printed onto a back side the interlaced structure, the composite image can be reversely printed for proper viewing from a top surface. Some common printing methods used with lenticular structures include offset printing, flexo-printing, and printing with use of so-called "digital presses", e.g., HP's Indigo 5600 or 7000.

Figure 1B:
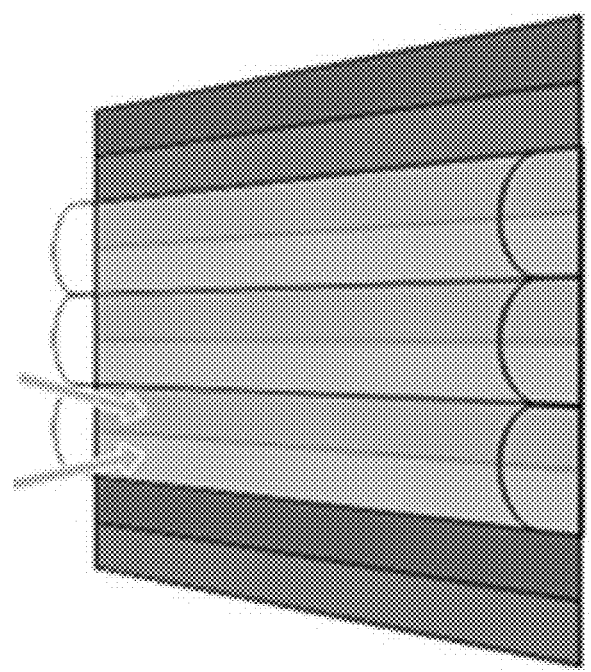
FIG. 1B illustrates a lenticular structure having interlaced strips.

Light is reflected off each stripe of a lenticular structure and refracted through the lenses in different directions, but with light from all stripes of a given image preferably refracted in the same direction. The produced effect is that one full image (or image portion), or a combination of all the image stripes of an original image, is viewable from a certain angle, and another full image (or image portion), or a combination of all the image stripes of another original image, is viewable from a different angle, and so on. Different effects can be achieved by using more or less stripes per lens and by altering the width and height of the lenses. See e.g., FIG. 1B.

Lenticular printing, lenses, image interlacing and related printing techniques are discussed, e.g., in U.S. Pat. Nos. 9,071,714, 9,021,947, 8,854,684, 8,693,101, 8,668,137, 8,605,359, 8,416,499, 7,712,673, 7,153,047, 6,900,944, 5,967,032, and 5,457,515, which are each hereby incorporated herein by reference in its entirety.

Returning to our anti-counterfeiting solution, multiple images (e.g., 3-12 images) are embedded with different digital watermarks, e.g., with each watermark including a different plural-bit payload, perhaps embedded with different signal strengths or properties. The images can depict really anything, including a brand logo, a noise pattern, a photograph, a design, artwork, etc.

Although different, the watermark payloads can be related in various ways. For example, only one of the plurality of payloads may be encoded with a public key ("public payload"). The remaining payloads can be encoded with one or more private keys ("private payloads"). Once decoded with the public key, the public payload can be used as an index to obtain, e.g., the corresponding private key(s) or the resulting expected private payloads. The index can be used locally with respect to an image capture device or communicated to a remote repository, e.g., a cloud based database.

A different implementation uses one or more public keys to decode each of the watermark payloads. The payloads are associated in a database, with a majority (or super majority) of decode payloads needed for authenticity. For example, for authentication, all decoded payloads are provided to a remote database and a super majority of them must match payloads within a set of payloads in order for the object to be deemed authentic.

In another implementation, the different payloads may be related through a cryptographic permutation. Once recovered, the different payloads can be processed with an inverse of the permutation to see if they correspond in an expected manner.

In still another implementation, an original payload is processed with an erasure code generator. The code generator produces a plurality of outputs corresponding to the original payload. Not all of the plurality of outputs are needed for a decoder to reconstruct the original payload, and non-sequential outputs can be used to reconstruct the original payload. Different outputs from the plurality of outputs are used as the different watermark payloads. Related payload construction is discussed in assignee's Published US Patent Application Nos. 20150227925 and 20140244514, e.g., with reference to their FIG. 16. Both of these US Patent publications are hereby incorporated herein by reference in their entirety.

Figure 1C:
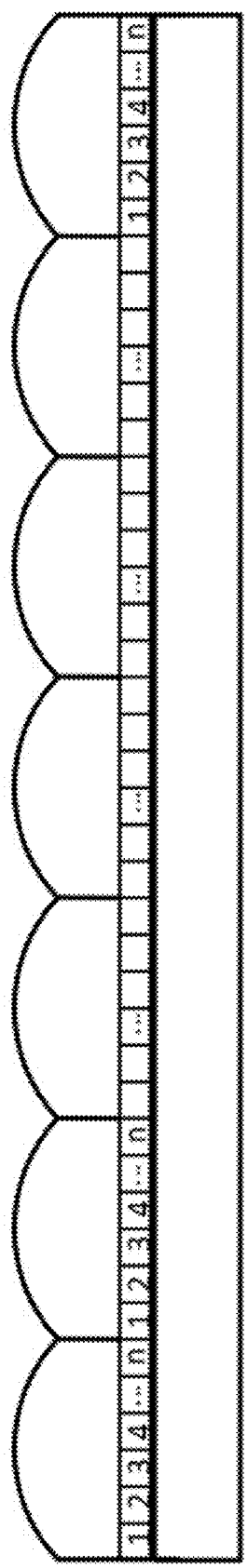
FIG. 1C illustrates a lenticular structure having interlaced watermarked images.

Recall from above that multiple images (e.g., 3-12 images) are embedded with different digital watermarks, e.g., with each digital watermark including a different plural-bit payload. The multiple images, e.g., watermarked image 1-$n$ (n being an integer), can be combined and interlaced into a single composite image so that, for example, a first stripe of the first watermarked image is disposed first, followed by a first stripe of the second image, . . . , followed by a first stripe of the nth watermarked image, followed by a second stripe of the first watermarked image, and so on. See, e.g., FIG. 1C.

A mobile device, e.g. a smartphone, obtains optical scan data from multiple different angles across the image. The optical scan data corresponds to the different watermarked images at different angles. A watermark detector analyzes the optical scan data to decode the different watermark payloads at the different angles. (Changing height or scale of the smartphone while capturing images may also yield different views.)

In addition to decoding the different payloads, the watermark detector can also determine a watermark "signal strength" or strength metric for each of the watermarks.

In one implementation, the digital watermark includes two primary components: a payload and a calibration signal. The calibration signal preferably remains the same from watermark to watermark. In one example, the calibration signal includes a constellation of peaks and associated phase in a transform domain. The watermark payloads may vary from watermark to watermark, of course, to carry different information. If the calibration signal is the same from watermark to watermark, and the payload is the changing signal, then a correlation with a payload tile may yield a signal strength. This correlation may be between a filtered image and array of watermark payload tweaks across the watermarked images.

Additional signal strength metrics are discussed in U.S. Pat. No. 7,054,461, e.g., a so-called Power Ratio and Payload Recovery Assessment. The U.S. Pat. No. 7,054,461 patent is hereby incorporated herein by reference in its entirety.

The power ratio metric measures, e.g., the degradation of a watermark signal (e.g., a calibration signal) at selected frequencies.

The payload recovery assessment measures watermark strength, including the degree of correlation between a reference signal and a detected signal, and a measure of symbol errors in raw message estimates. One way to measure the symbol errors is to reconstruct the raw message sequence using the same error correction coding process of the embedder on the valid message extracted from the watermark. This process yields, for example, a string of 1000 binary symbols, which can be compared with the binary symbols estimated at the output of a spread spectrum demodulator. The stronger the agreement between the reconstructed and detected message, the stronger the watermark signal.

Additional signal strength metrics are found, e.g., in the '461 patent and U.S. Pat. No. 7,286,685, which is hereby incorporated herein by reference in its entirety. See also the detection measures, signal strength and other metrics discussed in assignee's U.S. patent application Ser. No. 15/154,529, filed May 13, 2016 (issued as U.S. Pat. No. 10,217,182), which is hereby incorporated herein by reference in its entirety.

Once a signal strength (or detection measure) is determined for a particular watermark, it too can be used as an authentication clue. For example, it is possible that multiple digital watermarks may be detectable from a first viewing angle. How, the digital watermarks in the different images can be arranged so as to have different signal strengths (or detection measures). So an authentic detection may include a combination of expected payload reads with varying signal strengths across the lenticular structure.

A signature corresponding to signal strength or detection measure, or a signature corresponding to signal strength plus watermark payloads, can be used to authenticate, e.g., a consumer product, including a watermarked lenticular structure. The signature may include a ratio or relationship of signal strength across the lenticular structure. The signature may alternatively include an x amount (where x is an integer or percentage) of successfully decoded payloads, along with some measure quantifying variation in signal strength between the successfully decoded watermarks.

The signature may also rely on information from a device gyroscope. For example, angle and or position information may be obtained from the gyroscope and associated with each successful read. In a simple implementation, the lenticular lens structure is validated when each successful read had a different device position/angle as obtained from the device's gyroscope. In more complex implementations, relative position/angle differences between successful reads are compared against expected differences to ensure validation. The differences may be obtained from one or more of the different watermark payloads, or accessed in a remote repository. In some cases, the device gathers device position, signal strength and watermark payload information and sends such (or an abbreviated or filtered version of such) to a remote repository, which houses expected signature values.

Thus, the signature may be validated locally on a smartphone or other mobile device, or underlining information for such a signature may be provided to a remote location for validation.

The portable device may also include a graphical user interface (GUI), e.g., generated by a software program or app and displayed on a touch screen. The GUI may provide instructions or graphical prompting during a validation process. For example, an overlaid graphical box may outline the lenticular structure, with arrows directing relative motion between the device (camera view) and structure. The box can be shaded (or overlaid with different colors, green=success, red=keep trying) once a successful read is determined at a corresponding viewing angle. In another example, the GUI provides an arrow, bar or heat map to guide the user in scanning a watermark embedded lenticular structure. In still another implementation, the GUI provides a graphic of a ball or other object, which the user controls by relative movement of the device to the lenticular structure. In a game-like fashion the user must cover enough viewing angles to ensure that some or all of the payloads are detected. Input from a device gyroscope/accelerometer can be used to provide feedback and ball tracking.

One suitable lenticular material is Dura-Go/Lenstar Lenticular having 101.5 LPI (Lines per inch), 14 mil (350 micron) made by Tekra, a division of EIS, Inc. The Dura-Go is designed for use with the HP Indigo 5600 press. It has 101.5 lenticules per inch parallel to the 12 inch side of the sheet, and allows for reverse printing on the lenticular sheet.

Another suitable lenticular material is Forward Optics's MicroFlex Lens Array with 310 Lenses per inch (122 lenses per cm). Related lens structures can be found in U.S. Pat. No. 6,856,462, which is hereby incorporated by reference in its entirety.

In some implementations, one or more of the plural watermark payloads includes or cooperates with a serialization code. The serialization code provides a unique code with can be uniquely associated with a consumer, a product, a lot number, a distributor, etc. In these cases the serialization code includes a unique number that is associated with a consumer, retailer or distributor once the product is sold or registered. The association between the serialization code and consumer, retailer or distributor can be maintained, e.g., in a cloud-based data structure. Serialization can be readily facilitated by printing on a digital press, e.g., HP's Indigo presses. The serialization code can be changed per lenticular structure, batch of structures, etc.

In a brief, non-exhaustive summary, lenticular printing renders, e.g., 3-12, different images depending on relative camera pose/angle. The different images may each include a different digital watermark payload. The multiple different watermark payloads can be read at a determined signal strength that is associated to camera angle/pose or associated with an expected pattern or relationship across a lenticular structure. A counterfeit without a lenticular lens will not vary signal strength based on pose and thus can be recognized as fraudulent. Additionally, a counterfeit is unlikely to include all watermark payloads in a single image.

II. Anti-Counterfeit Signaling Using Metallic Inks

Our second solution utilizes machine readable indicia printed with metallic inks. Machine readable indicia may be carried by an encoded signal, e.g., digital watermarking. One example of digital watermarking is a continuous or sparse signal ("sparse mark") as disclosed in assignee's U.S. patent application Ser. No. 14/725,399 (issued as U.S. Pat. No. 9,635,378) and Ser. No. 15/072,884 (published as US 2017-0024840 A1), which are each hereby incorporated herein by reference in their entirety. Metallic inks (e.g., PANTONE PREMIUM Silver and PANTONE 877 Silver) are highly reflective when illuminated with a light source, e.g., a smartphone's flash or torch, compared to traditional inks. Metallic and regular ink of a similar color will appear flat or the same when printed unless illuminated by a torch or viewed at a particular diffuse reflection angle. With illumination, the metallic ink will have a higher reflectance compared to the regular ink. An anti-counterfeit digital watermark can be carried by the metallic ink. A large pallet of metallic colors is available in the PANTONE system for selection.

Metallic ink can be used to provide a so-called "sparse mark." The sparse mark becomes detectable under illumination with a torch. For example, the metal particles strongly reflects light relative to the regular ink. For a sparse mark, the signaling phase can be inverted so that highly reflective area correspond to the dark areas, e.g., as show in FIGS. 9-12 of the Ser. No. 14/725,399 application (and as issued in U.S. Pat. No. 9,635,378). The metallic ink can overprint the regular ink so that it appears flat with the regular ink under normal lighting conditions, but highly reflects with a flash.

Figure 2B:
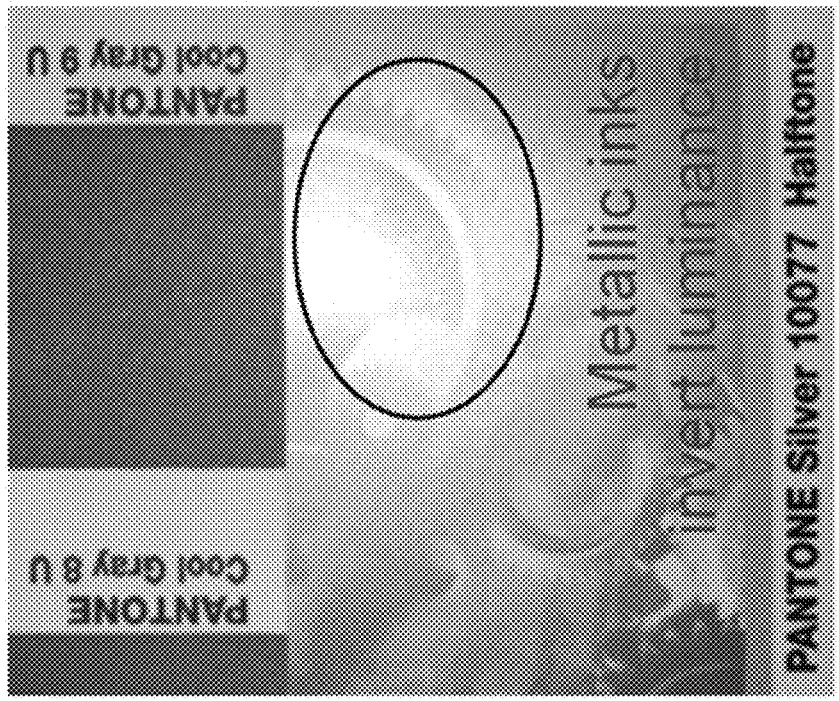
FIGS. 2A and 2B simulate images to show an effect of flash illumination (FIG. 2B) vs. ambient lighting (FIG. 2A). The circled area in FIG. 2B shows an inverse reflection effect relative to FIG. 2A.
Figure 2A:
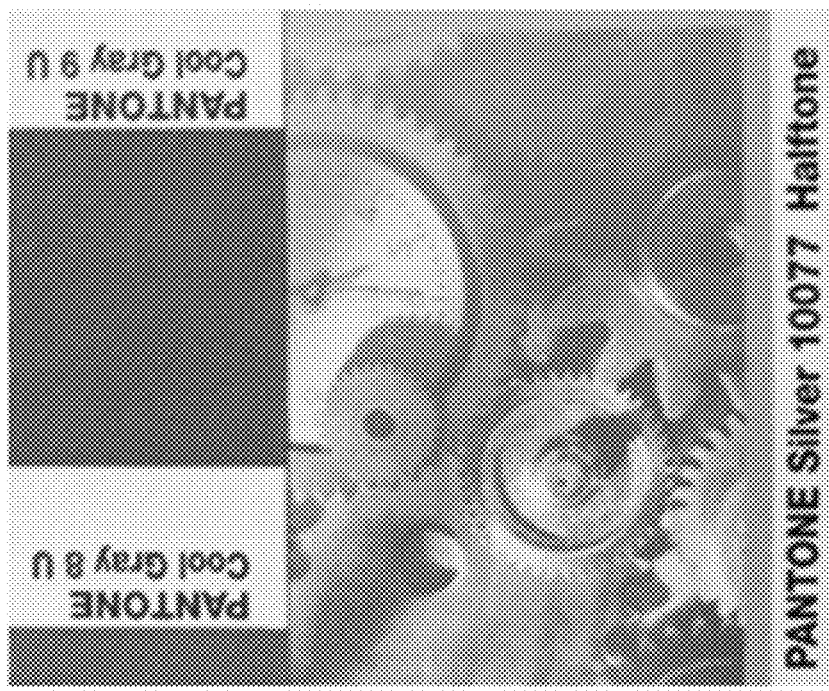

One authentication process obtains two (2) optically captured images (e.g., captured by a smartphone, digital camera, point of sale scanner, etc.) representing a metallic-ink-watermarked image, the first capture with a flash, and the second capture without a flash. Most often, the watermark will not be readable without the flash. For example, and with reference to FIGS. 2A and 2B below, a metallic ink can have a strong reflectance under illumination (FIG. 2B) compared to ambient lighting (FIG. 2A). See the circled area in FIG. 2B, and compare that area to the corresponding area in FIG. 2A.

In some cases, however, the watermark may be detectable at a certain diffuse reflection angle. In these cases, however, the digital watermark signal should be noticeably stronger (e.g., in terms of signal strength) with the flash than without. Suitable signal strength metrics are discussed above under Section I. For authentication and counterfeit detection, a watermark signal strength for each the two images (flash and no flash) is determined and then used for validation, since there will be a relatively stronger signal strength associated with the flashed image.

A counterfeited copy may include the watermark signal, but should not have such a relatively different signal strength (or change in message carrier polarity) between an image captured with a flash and one captured without. Additionally, two or more images can be captured without the flash, with at least one being captured at a viewing angle which obtains some diffuse reflection of the metallic ink. Signal strength of these two images can be used to determine an original (differing signal strength between the two images) from a counterfeit (negligible signal strength different between the two images).

Serialization on a digital press can be achieved by printing with silver/gray ink or printing with opaque white and gray on top of a silver foil. In the latter case, the white or gray covers all foil areas, e.g., except where a digital watermark is to be placed.

III. Narrow Band Absorption Dye

Figure 3:
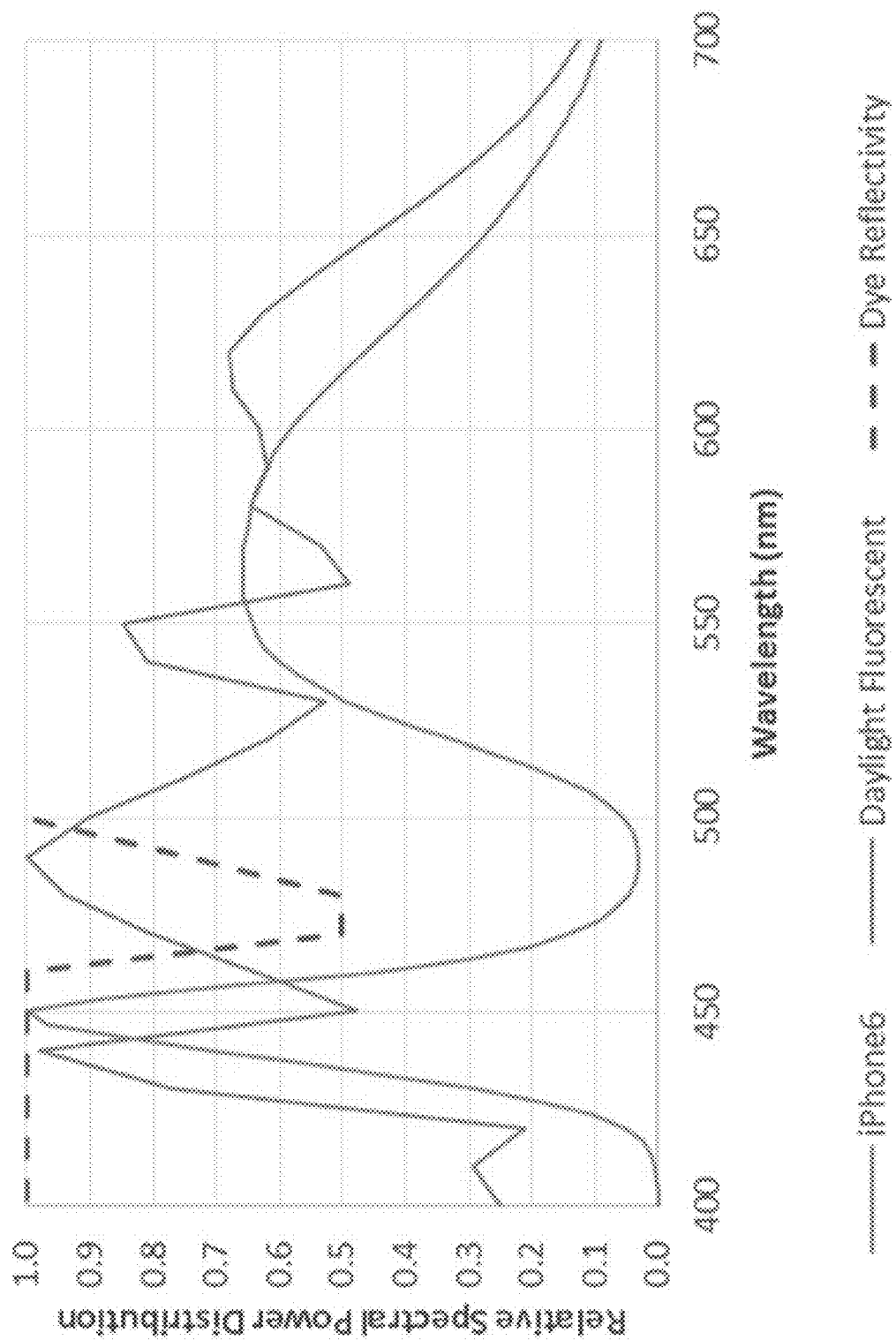
FIG. 3 is a diagram showing relative spectral power distribution for an iPhone 6 flash (line with a gentle bump at or around 565 nm), daylight fluorescence (line having a second narrow peak at or around 485 nm), and a narrow band dye (dashed line).

We have found that a wide variety of smartphones include an illumination torch having a non-uniform spectral distribution with a peak at or around 450 nm, and low power at or around 475 nm. This torch illumination is different from typical broadband ambient illumination (e.g., see "iPhone 6" vs. "Daylight Fluorescent" illumination shown in FIG. 3). We use the terms "at or around" in this patent document to mean plus or minus 15 nm. So, "at or around 450 nm" includes a range of 435 nm-465 nm, and "at or around 475 nm includes a range of 460 nm-490 nm.

A narrow band dye with a notch or minimum centered on or around the valley of the torch illumination produces a reflectivity change when the torch is switched on and off. See the dashed line in FIG. 4 for the relative spectral power distribution of the narrow band dye. Printing a watermark with a dye that has narrow band absorption at or around 475 nm yields a yellowish pattern. The contrast of the yellow pattern is reduced with torch illumination compared to ambient illumination. For example, see the Table 1, below, showing a simulation of a yellow pattern tint with ambient vs. torch illumination. Table 1 also shows a notch or minimum centered at or around 445 nm. As can be seen in the table, a center notch at or around 475 produces greater reflection differences.

TABLE 1

| Blue Channel Change with Original (Narrow Band Dye) | | |
|---|---|---|
| | Dye Type | |
| | Android Torch - Blue Reflection | Daylight - Blue Reflection |
| 475 nm (centered) | 98% | 87% |
| 445 nm (centered) | 82% | 87% |

Due to the lower reflectivity with the daylight illumination, a scanner will likely see more of a digital watermark signal under daylight vs. torch illumination. Hence detected watermark signal strength will likely be stronger with the ambient light detection relative to the torch illumination.

A digital watermark signal can be printed with the narrow band dye with a notch or minimum centered at or around 475 nm. The dye can be added to a varnish layer and used to print a digital watermark pattern on an offset or flexo press. Alternatively, the dye could be coated onto a package substrate and an opaque ink could then be used to cover up all but a digital watermark pattern, e.g., like a sparse mark discussed above. See also assignee's U.S. patent application Ser. No. 15/073,483, filed Mar. 17, 2016 (issued as U.S. Pat. No. 9,754,341), which is hereby incorporated herein by reference in its entirety, for an additional discussion on signal encoding with narrow band dyes and pigments, etc.

The dye with which this watermark signal is printed desirably appears clear on a substrate like a product package or sticker, to human inspection.

The width of the notch will depend on the range of illumination that is expected to be encountered. Desirably the notch is 100 or less nanometers in width. The illustrative embodiment has a notch of less than 50 nm in width. Other embodiments may have notches of less than 40 nm, e.g., 30, 20 nm or 10 nm. (Width is here measured as the bandwidth at which 50% or more of the incident light is absorbed.)

Inks and narrow band absorption dyes suitable for this spectral-notching purpose are available from a variety of suppliers, including Stardust Materials, LLC (Vancouver, Wash.), Gans Ink and Supply Co. (Portland, Oreg.), QCR Solutions, Corp. (Port St. Lucie, Fla., e.g., product VIS637A), Gentex Corp (Carbondale, Pa.) and SICPA SA (Lausanne, Switzerland). Some of the vendors make products to order, in accordance with specified customer requirements. Narrow-band absorbent dyes are also detailed in various patent documents, including U.S. Pat. Nos. 5,998,609, 7,559,983, 7,892,338, 8,840,029, 20120065313, and EP0638614. Such dyes can be carried by a gloss or matte varnish, such as Gans part number #26240.

For counterfeit detection, a detector would expect to see a difference in detected watermark signal strength under ambient and flash illumination. The signal strength metrics discussed above under Section I can be suitably used as metrics for these applications. Once authentication process proceeds as follows:

Switch on torch and read digital watermark from blue channel, and determine a corresponding signal strength=>signal strength 1.

Switch off torch and read watermark from blue channel, and determine a corresponding signal strength=>signal strength 2.

If signal strength 2 is greater than signal strength 1 then the document is considered an original. "Greater" is a relative term that can be set with testing of a particular dye and particular torches, and by then establishing relative thresholds.

A counterfeit would have approximately the same signal strength for a watermark signal detected from an image using torch illumination and with ambient lighting. The color in a counterfeit will likely be reproduced by a light yellow tint which has a broad absorption curve, since the typical ink jet printer would not have access to the narrow band dye. Table 2 shows a simulation of a yellow pattern tint (counterfeit) with ambient vs. torch illumination.

TABLE 2

Blue Channel Change with Counterfeit (Wide Band Dye)

| | Dye Type | |
|---|---|---|
| | Android Torch - Blue Reflection | Daylight - Blue Reflection |
| Light yellow | 88% | 88% |

A software program running on the smartphone (or other portable device) may include a graphical user interface which signals to user that the item is genuine or a fake. Such a determination can be based on a watermark signal strength comparison as discussed above.

IV. Single Channel Metamers Using Spot Colors

Another anti-counterfeiting technique uses cooperating spot color inks, e.g., PANTONE inks, that change color properties as seen by an image sensor and digital watermark detector based on different illumination conditions.

Figure 4:
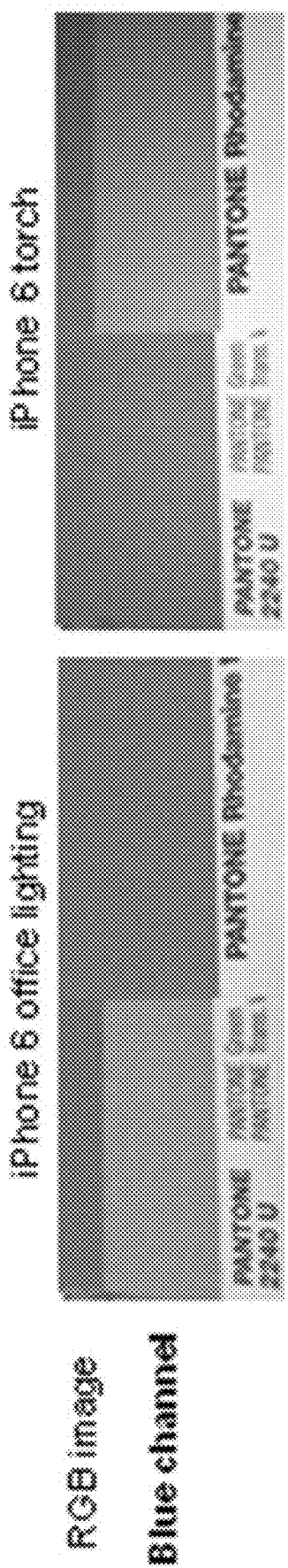
FIG. 4 illustrates color behavior in a blue channel for two different PANTONE colors under regular office lighting (left) and flash illumination (right) for an iPhone 6.

For example, consider FIG. 4. Pantone 2240 U and Pantone Rhodamine are selected a cooperating pair. A digital watermark is printed on an object using positive and negative signal modulations (e.g., tweaks) conveyed with the 2240 U (e.g., used for a negative tweak) and Rhodamine (e.g., used for a positive tweak). The tweaks can be arranged in a pattern, e.g., according to a spread spectrum function or sparse mark pattern, to convey a digital watermark signal. Under ordinary office lighting conditions a smart phone (e.g., iPhone 6) captures image data and analyzes the data in a sRGB space. The blue channel of captured image data can be analyzed to detect the tweak values. Under ordinary lighting conditions the blue channel Rhodamine tweaks are relatively darker than the 2240 U tweaks. Under flash illumination, however, the Rhodamine tweaks appear relatively lighter compared to the 2240 U tweaks. This would, in effect, invert the polarity of digital watermark signal. A digital watermark detector can be configured to interpret both polarities to detect the same watermark payload.

Thus, a digital watermark signal detected under one lighting source (e.g., ambient) may reverse its polarity under a different lighting source (e.g., flash illumination) and therefore be recognized as genuine. A detector can be specifically configured to expect differing polarities with different image captures. If the inverted polarities are not found, the object is considered a fake.

Now consider a copy of an object printed using the Rhodamine and 2240 U tweaks. Since these original colors are unique "spot colors" any reproduction (e.g., using an ink jet printer) will likely use process colors, e.g., CMYK. Process color inks are designed to have a stable color response across different lighting conditions and will therefore not yield an inverted polarity under flash illumination. Thus, a counterfeit can be recognized by taking two images of an object, one under ambient conditions and one under flash illumination. The two image will have the same polarity in a counterfeit.

V. Metallic Inks and Ink Pairs

Additional robustness can be achieved by combining two approaches, e.g., using metallic ink and ink pairs.

Figures 6A, 6B:
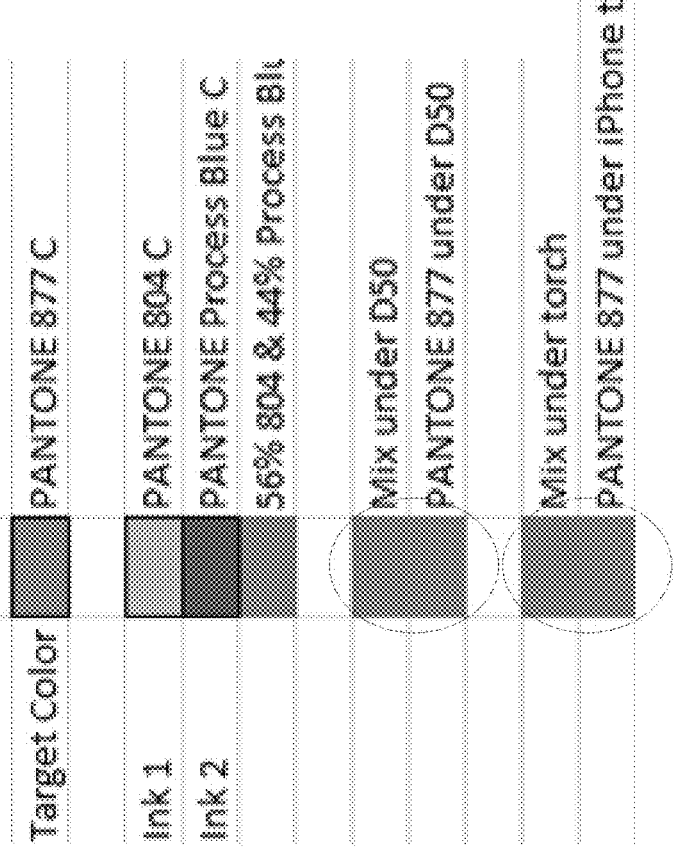
FIG. 6A shows a target color and mixture of two inks relative to one another under different lighting conditions.
FIG. 6B shows color values, color errors and Euclidean distances for the different grey patches of FIG. 6A.

For example, when creating an encoded signal on a printed object (e.g., product packaging), we can use a metallic ink plus an ink pair. Consider an example of PANTONE metallic 877 C, and a mix of PANTONE 804 C and PANTONE Process Blue (PB) C. With reference to FIG. 6A, a target color, PANTONE 877 C is selected for inclusion in a design. An ink pair, Ink 1 and Ink 2, are then selected such that a mixture of the two colors, approximates the target color under a first illumination source. Approximates in this specification refers to a color error between the mix and target color is equal or lower than 1 JND or a color error (ΔE) of 1 or lower. In this example, a mix of 56% 804 C and 44% Process Blue C can be used. The Ink 1 and Ink 2 mix approximates the target color under D50 (e.g., daylight) illumination as seen in FIG. 6A. In fact, with reference to FIG. 6B, the CIELAB values and the sRGB (more similar to a machine vision) for the 804 C/Process Blue C mix and the PANTONE 877 C, under D50 illumination, are the same.

These two colors (877 C and mix) have a very different appearance under flash illumination. In fact, with reference to FIG. 6B, the CIELAB values and the sRGB (more similar to a machine vision) result in a ΔE of approximately 4 and a Euclidean distance of around 13 under iPhone 6 illumination.

One outcome of this combination is that the two patches appear to be the same shade of gray (ΔE ~0.5) under one viewing condition (daylight D50), yet appear to be visually different (ΔE ~4) under a second illumination (iPhone torch).

Figure 8:
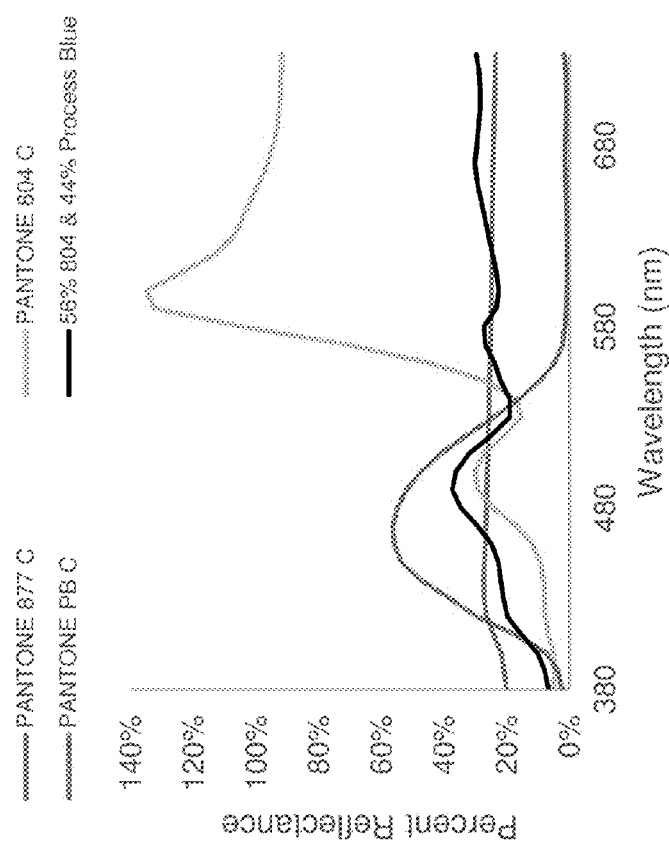
FIG. 8 is a graph showing reflectance of various inks per wavelength.
Figure 7:
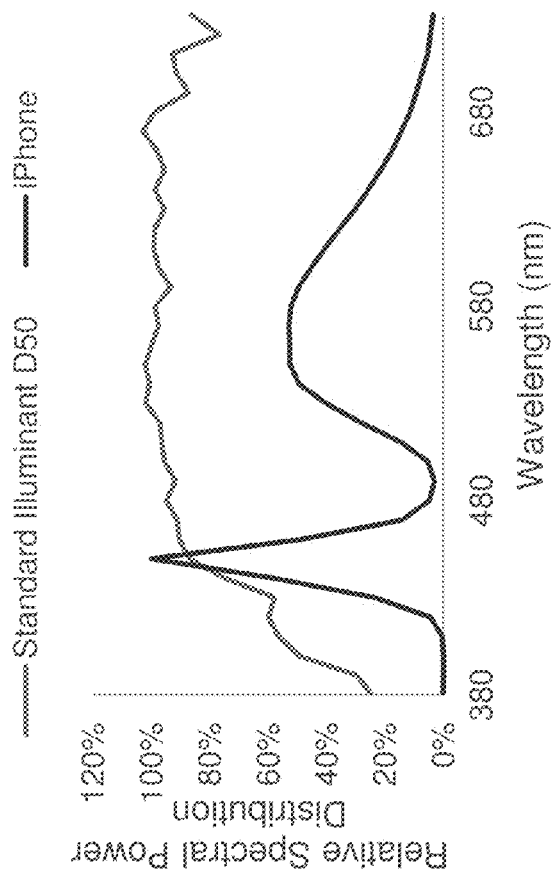
FIG. 7 is a graph contrasting relative spectral power distribution for D50 illumination and an iPhone flash illumination.

The relative spectral power distribution per wavelength for D50 and an iPhone 6 torch is shown in FIG. 7. A reflectance per wavelength chart is shown in FIG. 8, where PANTONE 877 C, Process Blue (PB) C, 804 C and a mix of 804 C and PB C are shown. As shown, the set of inks can create a neutral, but the combined spectrum of the mix is much different than the metallic. In practice, it's optimal to have the largest difference occur at the same locations as the largest difference between the illuminations. In this example, D50 and the torch have a large difference at or around 480 nm and 700 nm. As mentioned above, we use the terms "at or around" in this patent document to mean plus or minus 15 nm. So, "at or around 480 nm" includes a range of 465 nm-495 nm, and "at or around 700 nm includes a range of 685 nm-715 nm.

Such a combination of colors is a good anti-counterfeiting measure since inkjet printers can't recreate this effect, since consumer inks are typically limited to CMYK and are not expected to change their spectral properties in such a dramatic fashion.

So a sparse mark (or other encoded signal) could be detectable under a flash illumination (e.g., iPhone 6) since the grey patches (e.g., 877C and mix) are visually different, but are not distinguishable under normal lighting conditions since the grey patch approximate one another.

VI. Operating Environment

The components and operations of a watermark encoder (or embedder) and decoder (or detector) can be implemented in modules. Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. One such implementation is electronic circuitry that has been custom-designed and manufactured to perform some or all of the component acts, as an application specific integrated circuit (ASIC).

To realize such an implementation, some or all of the technology is first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes watermark detection operating on a specifically configured smartphone (e.g., iPhone 6 or Android device) or other mobile device, such phone or device including a flash or torch. The smartphone or mobile device may be configured and controlled by software (e.g., an App or operating system) resident on the smartphone device. The resident software may include a digital watermark detector and signal strength metric generator.

Figure 5:
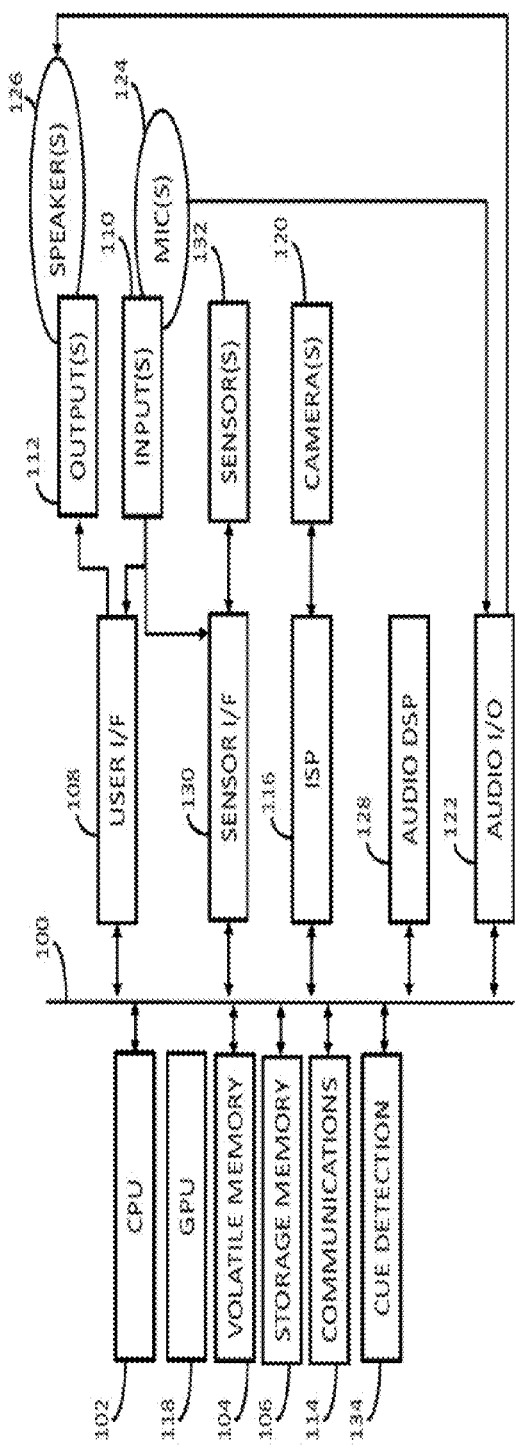
FIG. 5 is a diagram of an electronic device (e.g., a smartphone, mobile device, tablet, or other electronic device).

For the sake of further illustration, FIG. 5 is a diagram of an electronic device (e.g., a smartphone, mobile device, tablet, or other electronic device) in which the components of the above encoder and/or decoder embodiments may be implemented. It is not intended to be limiting, as the embodiments may be implemented in other device architectures or electronic circuitry.

Referring to FIG. 5, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 5 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A8 or A7. The A8 is built on a 64-bit architecture, includes a motion co-processor and is manufactured on a 20 nm process. The CPU 102 runs an operating system of the electronic device, runs application programs (e.g., mobile apps such as those available through application distribution platforms such as the Apple App Store, Google Play, etc., or custom designed to include watermark detection and object authentication) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. Watermark detection capabilities can be integrated into the operating system itself.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, an illumination source such as a flash or torch, a buzzer, a haptic actuator, a loud speaker, or the like or any combination thereof. In the case of an iPhone 6, the flash includes a True Tone flash including a dual-color or dual-temperature flash that has each color firing at varying intensities based on a scene to make sure colors and skin tone stay true.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's indigo press. An encoded object may include, e.g., a consumer packaged product, a label, a sticker, a logo, a driver's license, a passport or other identification document, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker. GPU 118 may also be configured to serve one or more functions of a watermark detector. In some cases GPU 118 searches for a watermark orientation component, while payload resolution is performed by the CPU 102.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal (s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensor(s) 132. Sensor 132 can, for example, include an accelerometer (e.g., for sensing acceleration, orientation, vibration, etc.), a magnetometer (e.g., for sensing the direction of a magnetic field), a gyroscope (e.g., for tracking rotation, orientation, or twist), a barometer (e.g., for sensing air pressure, from which relative elevation can be determined), a wind meter, a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 5, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety. Such documents are incorporated in their entireties, including all drawings and appendices, even if cited above in connection with specific of their teachings. These documents disclose technologies and teachings that can be incorporated into the arrangements detailed, and into which the technologies and teachings detailed herein can be incorporated.

The particular combinations of elements and features in the above-detailed embodiments are exemplary only; the interchanging and substitution of these teachings with other teachings in this and the incorporated-by-reference patents are also contemplated. Many combinations will be evident from the above disclosure.

What is claimed is:

1. An image processing method comprising:
obtaining n images, where n is an integer greater than 2;
transforming each of the n images with digital watermarking, in which the digital watermarking includes a unique plural-bit payload for each of the n images, in which said transforming yields watermarked n images;
generating a composite interlaced image by interlacing the watermarked n images; and
attaching the composite interlaced image with a lenticular lens structure, said attaching yielding a lenticular image article, in which said transforming utilizes different embedding signal strengths such that the composite interlaced image comprises multiple different embedding signal strengths.

2. The image processing method of claim 1 in which the lenticular lens structure comprises a lens sheet or a set of extruded lens lines.

3. A lenticular image article produced according to the method of claim 2.

4. The image processing method of claim 1 in which said lenticular lens structure reflects light in a plurality of different directions.

5. The image processing method of claim 4 in which detection of the digital watermarking from the plurality of different directions yields different detected embedding signal strengths associated with the digital watermarking.

6. A lenticular image article produced according to the method of claim 5.

7. An image processing method comprising:
obtaining first optically captured image data corresponding to a first viewing angle relative to a lenticular image article, the first optically captured image data representing the lenticular image article, the lenticular image article comprising a composite interlaced image and a lens structure, the composite interlaced image representing n interlaced images, where n is an integer greater than 2, in which the n interlaced images comprise digital watermarking;
obtaining second optically captured image data corresponding to a second viewing angle relative to a lenticular image article;
obtaining third optically captured image data corresponding to a third viewing angle relative to a lenticular image article;
processing the first optically captured image data, the second optically captured image data and the third optically captured image data to decode the digital watermarking; and
determining authenticity of the lenticular image article based on the decoded digital watermarking.

8. The image processing method of claim 7 in which the digital watermarking includes a unique plural-bit payload for each of the n images.

9. The image processing method of claim 8 in which said determining authenticity determines whether the unique plural-bit payloads, or a subset of the unique plural-bit payloads, are recovered.

10. The image processing method of claim 9 in which the digital watermarking comprises multiple different signal strengths.

11. The image processing method of claim 10 in which said determining authenticity comprises determining a combination of unique plural-bit payload reads and different detected signal strengths.

12. The image processing method of claim 10 in which said determining authenticity comprises determining a signature comprising information corresponding to unique plural-bit payload reads and different detected signal strengths.

13. An image processing method comprising:
obtaining first optically captured image data corresponding to a printed object, the first optically captured image data being captured under a first lighting condition, in which the printed object comprises a first ink printed thereon and a mixture of a second ink and a third ink printed thereon, the mixture of the second ink and the third ink approximating the first ink, and in which an encoded signal is carried on the printed object with the mixture of the second ink and the third ink;
obtaining second optically captured image data corresponding to the printed object, the second optically captured image data being captured under smartphone flash illumination, in which a spectral response of the mixture of the second ink and the third ink has a difference compared to a spectral response of the first ink at a wavelength where there occurs a spectral difference between the first lighting condition and the smartphone flash illumination;

using one or more configured electronic processors, determining whether the printed object is authentic based on encoded signal detections from the first optically captured image data and the second optically captured image data.

14. The image processing method of claim 13 in which said determining comprises determining that the printed object is authentic when the encoded signal is detectable from the second optically captured image data and is not detectable from the first optically captured image data.

15. The image processing method of claim 13 in which the encoded signal comprises digital watermarking.

16. The image processing method of claim 13 in which the first ink comprises a metallic ink, and the second ink and the third ink each comprise a spot color.

17. The image processing method of claim 13 in which the first ink comprises PANTONE 877 C, the second ink comprises PANTONE 804 C, and the third ink comprises PANTONE Process Blue (PB) C.

18. The image processing method of claim 17 in which the mixture of the second ink and the third ink comprises 56% PANTONE 804 C and 44% PANTONE Process Blue C.

19. The image processing method of claim 13 in which the first lighting condition comprises D50 illumination, and in which the first lighting condition and the smartphone flash illumination comprise spectral differences in a range of 465 nm-495 nm or in a range of 685 nm-715 nm.

* * * * *